United States Patent
> Hobbs et al.

[15] 3,644,722
[45] Feb. 22, 1972

[54] VERTICAL CONTROL SYSTEM
[72] Inventors: James Hobbs; John B. Carocari, both of Overland Park, Kans.
[73] Assignee: Butler National Corporation, Oak Brook, Ill.
[22] Filed: Aug. 18, 1969
[21] Appl. No.: 850,770

[52] U.S. Cl. ......................235/150.23, 244/77 D, 343/108
[51] Int. Cl. .........................................................G06g 7/78
[58] Field of Search ..................235/150.2, 150.23, 150.26, 235/150.27; 343/108; 340/27; 244/77 D, 77 A

[56] References Cited
UNITED STATES PATENTS
3,398,267  8/1968  Hattendorf ......................235/150.26

Primary Examiner—Rodney D. Bennett, Jr.
Assistant Examiner—R. Kinberg
Attorney—Hill, Sherman, Meroni, Gross & Simpson

[57] ABSTRACT

A vertical control system which allows pilots of aircraft to control their ascent and descent based on distance and altitude information so as to reach a point over the ground at a desired altitude. The set point at which the desired altitude is to be reached may be offset from a radio transmitting station either before or after the station and the desired angle of descent or ascent may be set into the system so as to control the aircraft in the desired profile.

10 Claims, 6 Drawing Figures

INVENTORS
JAMES HOBBS
JOHN B. CAROCARI

INVENTORS
JAMES HOBBS
JOHN B. CAROCARI

VERTICAL CONTROL SYSTEM

BACKGROUND OF THE INVENTION

1. Field of the Invention

This invention relates in general to aircraft control systems and in particular to an ascent-descent director for controlling an aircraft so that it arrives over a desired location at a desired altitude and at a selected glide or climb angle.

2. Description of the Prior Art

The lateral control of aircraft has been developed to a high degree but only recently has the problem of vertical control of aircraft been considered in great detail. Prior vertical control of aircraft has been generally by verbal directions from a ground controller who assigns altitudes to aircraft so as to maintain minimum spacings. In the terminal areas, the ground controllers have instructed pilots of aircraft to move to different altitudes and such instructions have continued until the aircraft is in a position to intercept a glide slope of an instrument landing system after which the approach to the runway and landing is accomplished.

A number of problems are presented when an aircraft changes altitude in that a certain time and descent angle is required to arrive at a particular point at a predetermined altitude. Aircraft, of course, cannot safely be operated at extreme descent angles and thus on a straight descent the descent must be commenced early enough to arrive at the point at the desired altitude.

SUMMARY OF THE INVENTION

The present invention provides an aircraft control system which allows the ascent and descent path of an aircraft to be selected so that a particular location will be reached at a desired altitude. The system utilizes inputs from a distance measuring system which measures distance to a fixed ground station and altitude which is determined by transducers on the aircraft or by other means such as radio altimeters. The point over the ground and the altitude at which it is desired that the aircraft be at when it arrives at the point are set into the system as are the angle at which the aircraft is to intercept the desired altitude. In addition, the present altitude of the aircraft is known as well as the altitude of the distance measuring transmitting station which is being utilized by the system.

The present invention calculates and indicates to the pilot commands so that the desired profile is obtained and the aircraft is operated to the selected point and arrives at the selected altitude.

A selected vertical speed may also be selected by differentiating the distance to waypoint and the tangent of the angle of ascent or descent and comparing this to the selected vertical speed.

Other objects, features and advantages of the invention will be readily apparent from the following description of preferred embodiments thereof taken in conjunction with the accompanying drawings, although variations and modifications may be effected without departing from the spirit and scope of the novel concepts of the disclosure, and in which.

DESCRIPTION OF THE PREFERRED EMBODIMENT

The present invention comprises an ascent-descent director comprising an analogue computer which is designed to provide positive vertical guidance information based on distance and altitude inputs. It allows the selection of programmed vertical profiles as well as vertical profiles that may be selected spontaneously to obtain a desired flight path.

To obtain a spontaneously chosen profile the following information is required;

1. The desired altitude to which the aircraft is to ascend or descend.
2. The point over the ground at which the desired altitude is to be reached.
3. The angle at which the aircraft is to intercept the desired altitude.
4. The altitude of the VOR/DME station being utilized.

The present invention will calculate and supply to an indicator the proper command for the pilot so that he will fly the desired profile after the above information has been entered into the system.

An example of the use of the invention may be understood by considering the following situation:

If a pilot is flying at 28,000 feet altitude in which he is to descend on a 4° angle to 20,000 feet to a given point which is 5 miles from a DME station or a way point in an area navigation system, the pilot will set into the invention the elevation of the ground station being received and will then set in the 5-mile "offset" and will set a switch which determines whether the offset point is 5 miles before or 5 miles after the station. He will then set in the desired altitude of 20,000 feet and the 4° in the "angle set." The present invention provides an indicator lamp which is lighted when the "angle set" has been set to command the computer to fly a constant slope rather than a constant altitude.

The present invention will give a flyup command indicating that aircraft has not yet intercepted the desired glide path if the desired flight path is possible.

The aircraft would proceed in level flight until the computer indicates that the plane is on the glide path profile and the pilot would then hold the indicator needle centered to keep the aircraft on the desired profile. Any deviation from the selected profile would result in a "flyup" or "flydown" command.

When the aircraft has reached an altitude of 25 feet above the one set into the desired altitude window (in the example 20,025 feet), the "angle set" light will be extinguished and the "desired altitude" lamp will light indicating that the computer is in the constant altitude mode. The pilot would continue to hold the indicator needle centered so that the aircraft remains at the desired altitude. In the event the aircraft deviates from the selected altitude by more than 250 feet an altitude alarm would be energized until the aircraft was again within the 250 foot limit. The alarm may be automatically inhibited when a new altitude is commanded in the computer.

Figure 2:
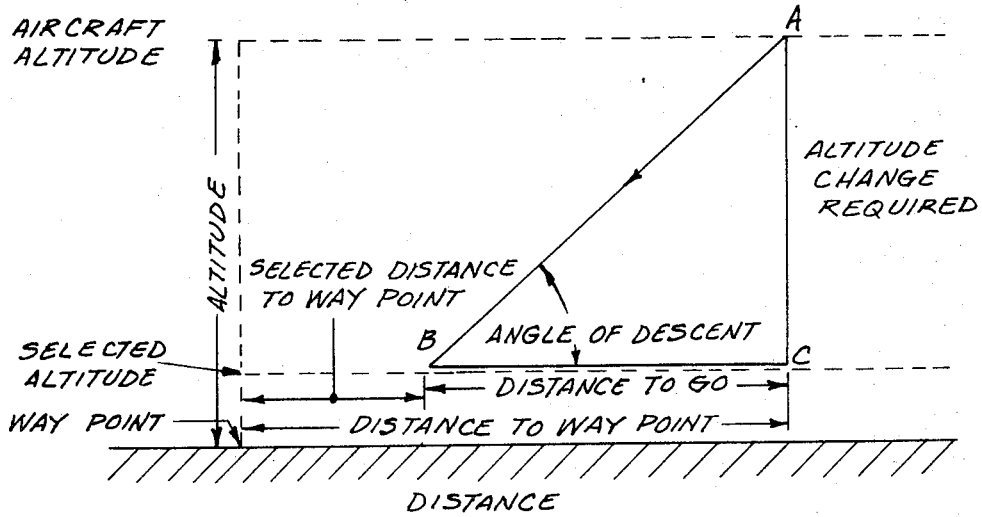
FIG. 2 is a view showing the trigometric relationship of the aircraft and radio station.

The basic computation in the system of the present invention may be understood by considering FIG. 2. Point A represents the present position of an aircraft, point B at which the aircraft wishes to intercept a given altitude and point C represents a point below the present position of the aircraft projected downwardly to the selected altitude.

It is to be observed that tan ABC is equal to AC/BC and (BC) (tan ABC) equals AC.

If the angle ABC is less than 10°, the tangent of the angle is approximately equal to the angle in radians with an error of less than 1 percent.

Thus, for angles less than 10° (BC) (ABC) = AC.

If two voltages are generated, one of which is proportional to (BC) (ABC) and the other which is proportional AC, and the two voltages are compared, any discrepancy in their magnitudes will reflect a deviation of the aircraft from the glide path AB. This computation is performed by the computer of the present invention.

Figure 3:
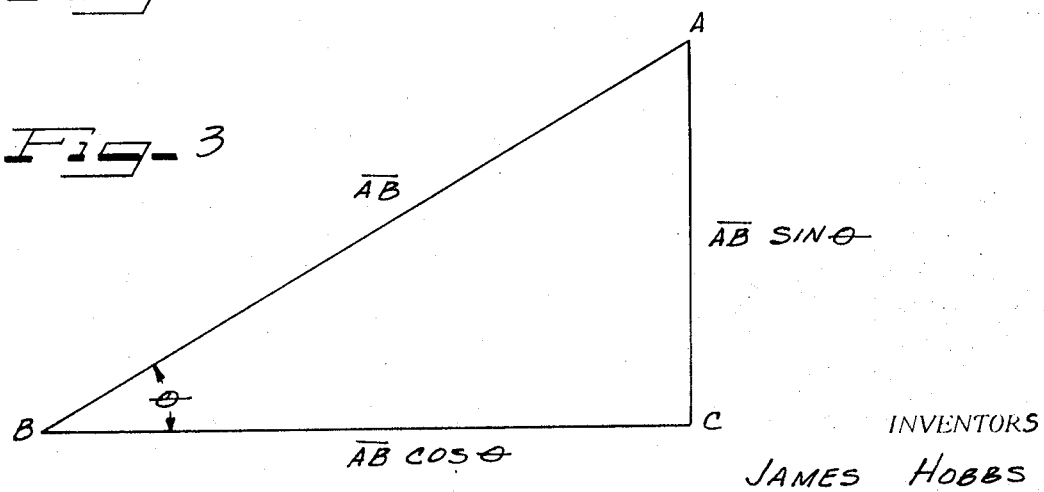
FIG. 3 illustrates the trigometric relationship to solve the control problem of the invention.

FIG. 3 may be considered to show that if an airplane is at point A and a DME ground station is at point B, the plane receives DME information proportional to the side AB. The desired information is the length of the side BC. It can be seen that the altitude of the aircraft corrected to the station altitude is equal to the side AC. The side BC may be expressed as AB cosine $\theta$ and side AC can be expressed as AB sine $\theta$.

Thus, if a voltage which is proportional to the DME input is fed into a resolver and the amplitude of the sine winding output is kept equal to a voltage which is proportional to the difference in altitude of the DME station and the aircraft; the resulting output voltage of the cosine winding will have a magnitude proportional to the true "over the ground" distance.

Figure 4:
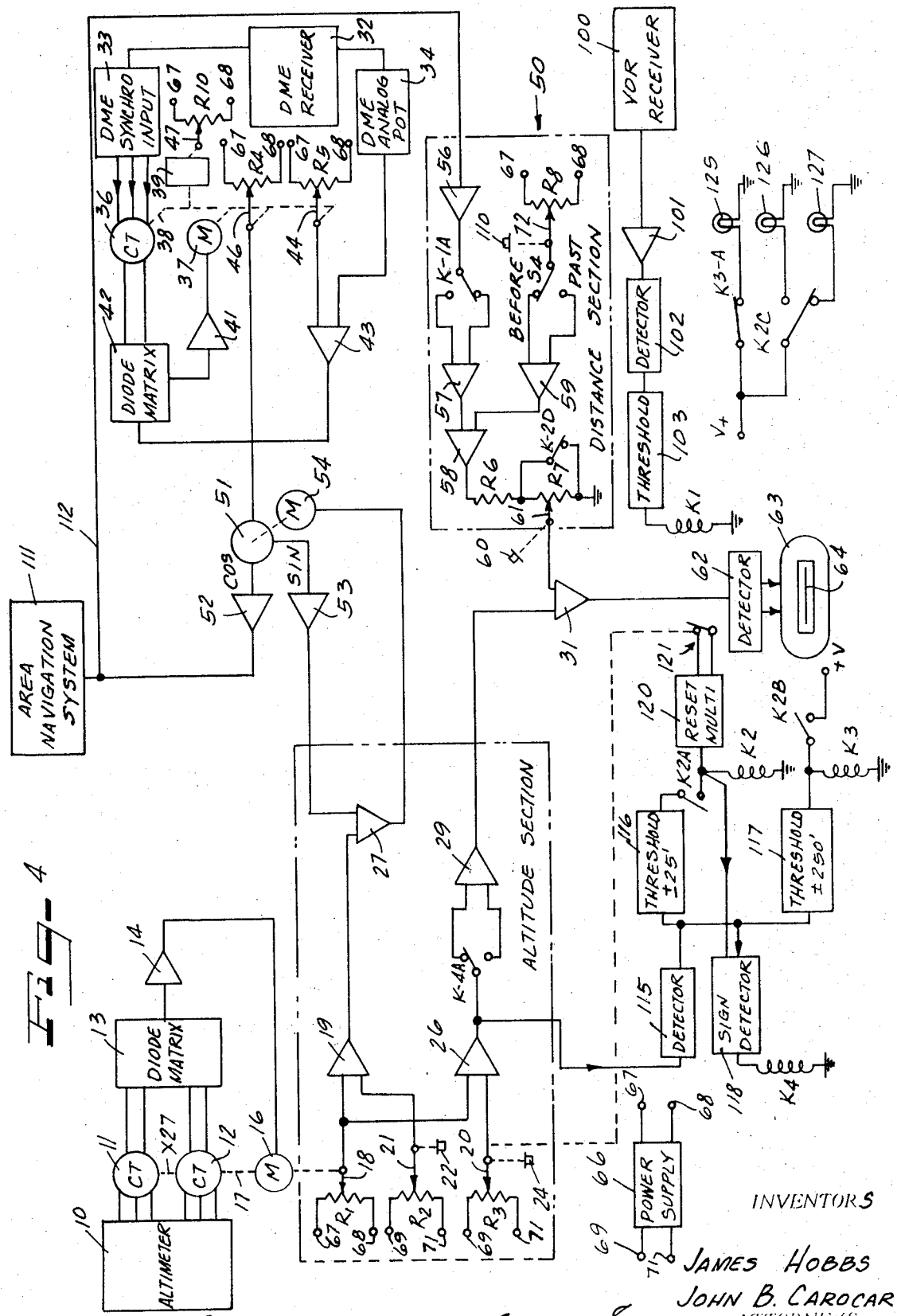
FIG. 4 is a block view of the control system of the invention.

FIG. 4 illustrates an altimeter 10 which supplies outputs to a pair of control transformers 11 and 12. The control transformers 11 and 12 are coupled together by the output shaft 17 of servomotor 16. A diode matrix 13 receives the outputs from the control transformers 11 and 12 wherein the outputs are mixed and the resultant output is amplified by the amplifier 14 and supplied to the input of the servomotor 16. The servomotor output shaft 17 is also connected to move the wiper 18 of a potentiometer $R_1$ which is energized by a first phase of an oscillator 66 which appears at terminals 67 and 68. The output of potentiometer $R_1$ is proportional to the aircraft's altitude.

A distance input is received from the DME receiver 32 which supplies a low-speed output in the form of an analog potentiometer signal which is received from the DME analog potentiometer 34 which applies an output to amplifier 43. The output of the pot 34 is compared with an input from the wiper contact 44 which is connected to the potentiometer $R_5$. Then the output of the amplifier 43 is fed to the diode matrix 42. The diode matrix 42 also receives an input from control transformer 36 which is energized by the DME unit synchros 33 which are connected to the DME receiver 32. The servoamplifier 41 receives the output of the diode matrix and supplies an input to the servomotor 37 which has its output shaft connected to the control transformer 36 and to wiper contacts 46 and 44 of potentiometers $R_4$ and $R_5$ and to a wiper contact 47 of potentiometer $R_{10}$ through a gear reduction 39. In the presence of a large output from amplifier 43 the servomotor 37 drives the servo train in a direction so as to reduce the output of the amplifier 43. When the output of the amplifier 43 is small enough the diode matrix switches the input of amplifier 41 to the control transformer 36 output and the motor then maintains a null at the control transformer output. Potentiometer $R_4$ is connected by shaft 38 to the output of the servomotor 37 and the voltage on wiper contact 46 is proportional to the slant range or DME input. The voltage on contact 46 is fed into a resolver 51 which has output sine and cosine windings.

The sine output winding from the resolver 51 is connected to an amplifier 53 which supplies an input to the amplifier 27. The output of the amplifier 52 is supplied to the input of an amplifier 56 in a distance section 50. The output of amplifier 56 is fed to a switch K1A that has two positions. The stationary contacts of switch K1A are connected to the input of an amplifier 57. The output of the amplifier 57 is connected to an amplifier 58 which also receives an input from an amplifier 59. Amplifier 59 has a pair of inputs which are connected to stationary contacts of switch $S_4$ which has a movable contact connected to a wiper contact 72 of the potentiometer $R_8$. The potentiometer $R_8$ allows the offset to be set into the computer and knob 110 is provided for this purpose.

The voltage on wiper contact 18 represents the instantaneous altitude of the aircraft and the voltage on the wiper contact $R_2$ appearing at contact 21 represents the altitude of the DME/VOR station. These two signals are fed to the difference amplifier 19 where an output proportional to the altitude of the plane above the station is obtained. The output of the amplifier 19 is compared in the amplifier 27 with the output of amplifier 53. Any unbalance between these two signals will cause a servomotor 54 to rotate the slant range resolver 51 so as to make the sine output supplied to the amplifier 53 equal to the plane's altitude above the station. The resultant cosine winding output is supplied to amplifier 52 and is proportional to the corrected horizontal distance. This output is fed as distance information to an area navigation system 111 or to the distance section 50 by lead 112 which is connected to the amplifier 56. The oscillator 66 provides a first output phase signal at terminals 67 and 68 which are connected respectively to terminals 67 and 68 of potentiometer $R_1$, and the contacts of potentiometers $R_4$, $R_5$, $R_8$ and $R_{10}$. A second output is passed through an inverter from the oscillator 66 and appears at terminals 69 and 71. This output of the oscillator 66 is applied to terminals 69 and 71 of potentiometers $R_2$ and $R_3$.

The distance section 50 produces a voltage which indicates the distance of the aircraft from the point on the ground at which the desired altitude is to be attained. The input to the amplifier 56 represents the horizontal distance from the aircraft to the DME station or to the area navigation way point. The output of the amplifier 56 is fed to amplifier 57 through switch K1A which is controlled by relay K1. It is to be noted that the signal fed into the amplifier 56 is always phase B which is out of phase with the signal appearing at terminals 67 and 68 by 180°. If the area navigation way point or the DME is ahead of the airplane, the contact of switch K1A is in the position shown in FIG. 4 and the output of amplifier 57 which is connected to the stationary contacts of switch K1A is inverted to an A-phase. If the area navigation way point or DME station is behind the aircraft, contact switch K1A of relay K1 will be in the opposite position to that shown in FIG. 4 and the output of amplifier 57 will be "B" phase.

The voltage on contact 72 of the potentiometer $R_8$ is proportional to the distance from the area navigation way point or the DME station to the point at which the desired altitude is to be obtained. This distance is termed the "offset" and the offset point is defined as the ADD way point. If the ADD way point is to be moved toward the airplane the "Before/Past" switch $S_4$ is placed in the "Before" position which does not invert the signal into the amplifier 59. This causes the output of amplifier 59 to be of "B" phase which tends to subtract from the "A" phase of amplifier 57 thus decreasing the distance value. The comparison of the outputs of amplifiers 57 and 59 is made in difference amplifier 58.

If the ADD way point is displaced away from the airplane, the "Before/Past" switch $S_4$ is placed in the "Past" position which causes the output of amplifier 59 to invert thereby producing an "A" phase output. In this case, as long as the area navigation way point or DME is ahead of the airplane, the amplifier 57 output will be "A" phase and hence adds to the output of amplifier 59 thus producing an output proportional to the total distance to the ADD way point. Once the area navigation way point or DME station has been passed, the relay K1 will move the switch K1A causing the output of amplifier 57 to produce a "B" phase output which will subtract from the magnitude of the amplifier 59 output. When the desired ADD way point has been reached, the magnitude of the outputs of amplifiers 57 and 59 will be equal but of opposite phase. This causes the output of amplifier 58 to be zero.

The relay K1 is actuated from VOR receiver 100 through amplifier 101 which applies an output to detector 102. A threshold circuit 103 receives the output of detector 102 and energizes relay K1 when the area navigation way point or DME station has been passed.

If the computer is in the "constant angle" mode, switch K-2D will be open and contact 61, which is set by knob 60, determines the desired descent angle. Switch K-2D is controlled relay K2. A detector 115 receives the output of amplifier 26 and supplies inputs to the threshold circuits 116 and 117. The detector 115 also supplies an input to sign detector 118. The output of sign detector 118 energizes relay K4. The threshold 116 might be set at a plus or minus 25-foot level and the threshold 117 may be set to plus or minus 250-foot level. Relay K3 is connected to the output of the threshold circuit 117. Switch K2B is connected between the threshold circuit 117 and a positive voltage source. A mechanical actuator 121 which is connected to wiper 20 of resistor $R_3$ supplies the input to a reset multivibrator 120. The reset multivibrator 120 also supplies an input to the sign detector 118. Relay coil K2 is connected between the output of the reset multivibrator 120 and ground and switch K2A is connected between the reset multivibrator 120 and the threshold circuit 116.

The function of the altitude section of the computer is to produce two voltages. One voltage is proportional to the altitude of the plane above the ground station and is derived as discussed above. The other output voltage is proportional to the difference between the altitude of the aircraft and the desired altitude. The voltage on wiper 20 of potentiometer $R_3$ is proportional to the desired altitude and corresponds to the "B" phase of the power source. The voltage on the wiper of potentiometer $R_1$ is proportional to the actual altitude of the aircraft and is always phase "A" of the power supply. These two voltages are fed into the difference amplifier 26 whose output is then proportional to the above stated altitude difference. The phase is dependent on whether the aircraft is above or below the desired altitude. If the plane is ascending to a higher altitude the output of amplifier 26 will be phase "B." Under these conditions, contact of switch K–4A will be in the position as shown. It is to be realized that the switch K–4A is controlled by relay K4 and the output of amplifier 29 will be phase "B" and can be balanced by the output of the distance section 50.

If the aircraft is descending to a desired altitude the output of amplifier 26 will be "A" phase but switch K–4A will be in the opposite position as shown in FIG. 4 thereby causing an inversion in amplifier 29. The output of amplifier 29 will again be "B" phase and will balance out the distance information.

The desired distance/altitude comparison is then made in amplifier 31 which has its output converted into a DC voltage in the detector 62 to drive a standard meter movement 64 of the indicator 63.

When the aircraft reaches the desired altitude switch K–2D closes thus shorting out the distance information. The action of relay K4 is also inhibited when the aircraft reaches the selected altitude. The result is that the meter is fed altitude information. Thus, as the aircraft is flown the meter movement 64 will command the desired altitude.

An auxiliary output is taken from the amplifier 26 and supplied to the detector 115 which produces a DC voltage with a magnitude proportional to the magnitude of the output of the amplifier 26 and with a polarity determined by the phase of the output of the amplifier 26.

When a desired altitude is set into the computer by adjusting the knob 24 to move the wiper contact 20, a voltage will be developed at the output of the detector 115. Also, the action of "setting in" the desired altitude causes the "reset multivibrator" 120 to momentarily energize relay K2. This causes switch K2A to close which then holds relay K2 latched in as long as there is output from the 25 foot threshold circuit. When relay K2 is energized:

1. An enabling voltage is provided to the sign detector circuit 118.

2. Contact K2B closes keeping relay K3 energized and thereby inhibiting the altitude alarm light 125 which is controlled by contacts K3–A.

3. K2C applies voltage to the "constant slope light" 126 and removes it from the constant altitude light 127.

The sign detector circuit 118 will energize relay K4 as discussed above.

When the aircraft has obtained the desired altitude within 25 feet, relay K2 drops out and cannot be reenergized until the reset multivibrator 120 is again retriggered. With relay K2 deenergized:

1. The sign detector circuit 118 is inhibited thereby permitting either "A" or "B" phase outputs from amplifier 29.

2. Relay K3 is energized only by the 250-foot threshold circuit 117.

3. The "constant altitude lamp" 127 is lighted and the "the constant slope lamp" 126 is extinguished; and 4. The "distance section" 50 output is inhibited.

If the aircraft varies from the desired altitude by more than 250 feet, the 250-foot threshold circuit releases relay K3 causing the altitude alarm light 125 to light.

Amplifier 101 receives the "TO-FROM" information from the VOR receiver 100 and operates relay K1 through the detector 102 and threshold circuit 103 to provide the proper phase output from amplifier 57 by actuating the switch K1A as described above.

Figure 1:
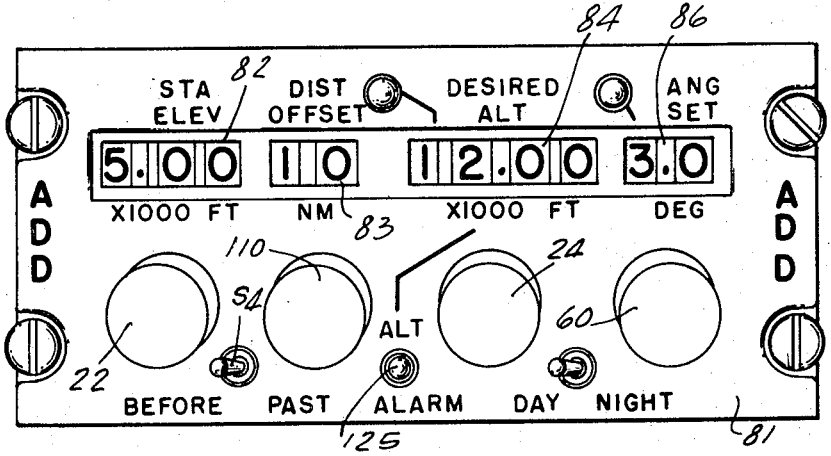
FIG. 1 is a plan view of the control panel of the system of the invention.

FIG. 1 illustrates the control panel of the invention which would be mounted so that the pilot has access to it. Plate 81 is formed with a station elevation window 82 which may be set by knob 22. A distance offset window 83 may be set by the knob 110. The desired altitude window 84 may be set by the knob 24 and the angular set window 86 may be set by knob 60. The "Before/Past" switch $S_4$ is mounted on the panel as is the altitude alarm 125.

In operation, the pilot of an aircraft may set the desired parameters in the control panel of FIG. 1 and by flying the aircraft in accordance with the command of the meter movement 64 of the indicator 63 will arrive at the desired point at the correct altitude.

Figure 5:
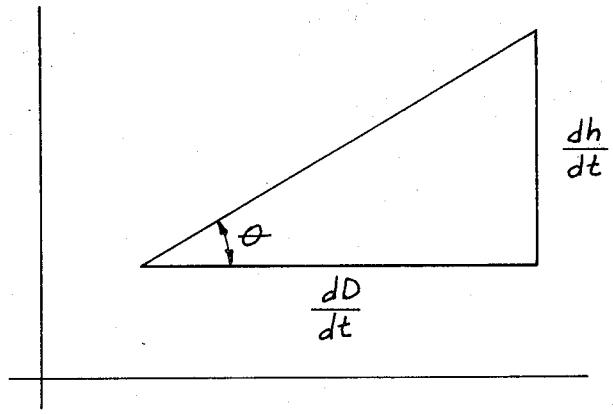
FIG. 5 illustrates he relationship of vertical speed and ground speed.
Figure 6:
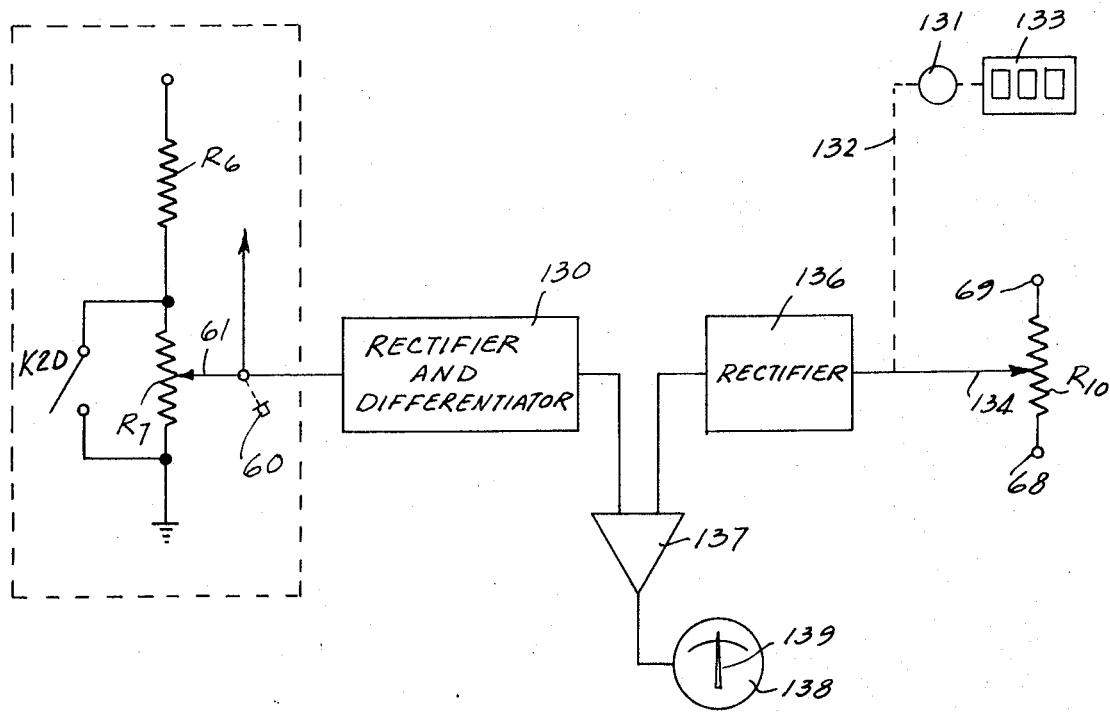
FIG. 6 illustrates an additional feature of the invention.

FIGS. 5 and 6 illustrate an additional feature which can be obtained with the present system.

As shown in FIG. 5, $$\tan\theta = \frac{\frac{dh}{dt}}{\frac{dD}{dt}} \quad (1)$$

where $(dh)/(dt)$ is the vertical velocity (rate of ascent or descent) and $(dD)/(dt)$ is the ground velocity to the way point. Therefore:

$$\frac{dh}{dt} = \frac{dD}{dt} \tan\theta \quad (2)$$

The voltage on contact 61 of potentiometer $R_7$ shown in FIG. 4 is proportional to the product of distance to the way point (D) and tangent of the angle of descent or ascent (tan $\theta$). If this voltage is differentiated the resulting voltage is proportional to the right-hand term of equation 2. Since tan $\theta$ is a constant selected by the pilot, his voltage will vary with the ground velocity of the aircraft.

FIG. 6 illustrates potentiometer $R_7$ and contact 61 connected to rectifier and differentiator 130. A knob 131 is connected to shaft 132 to set an indicator 133 to a selected vertical speed and to set contact 134 which engages potentiometer $R_{10}$ which is energized by terminals 67 and 68 of power supply 66.

The output of potentiometer $R_{10}$ is rectified by rectifier 136 and is compared in differential amplifier 137 with the output from rectifier-differentiator 130. A zero-center meter 138 has a needle 139 which indicates "fast" or "slow" if the aircraft's ground velocity differs from that required to make good the selected vertical speed. The output of amplifier 137 will be negative or positive and the needle 139 will indicate to the pilot that the ground velocity must be adjusted to make good the selected rate of descent (ascent) along the selected vertical profile.

The readout for selected vertical would be added to ADD control panel and the "Slow-Fast" meter could either be mounted separately on the instrument panel or on the ADD control panel.

This feature could be used to preadjust the aircraft's ground speed prior to reaching the glide slope (in straight and level flight, if desired) so as to make good the desired rate of descent (or ascent).

The "Slow-Fast" indicator gives proper guidance even in level flight. It should be pointed out this indication can not be used as guidance to fly down (or up) the selected glide path since actual rate of descent (or ascent) information is not an input to the computer. The normal output of the ADD computer (UP-DOWN signal) would still have to be used to guide the aircraft along the selected path in space. However, the "Slow-Fast" indicator would provide valuable information not now available to the pilot since generally only air speed is the only data available or if ground speed is available, a mental computation is required to solve for the desired rate of descent.

It will be understood that modifications and variations may be effected without departing from the spirit and scope of the novel concepts of the present invention.

We claim as our invention:

1. A navigation system for aircraft comprising an altimeter determining the aircraft's altitude, means for producing a signal proportional to a selected altitude to which the aircraft is to be maneuvered, a distance measuring receiver producing an output indicative of the slant range of said aircraft from a ground station, means producing a signal of the altitude of said ground station, a servosystem receiving signals from the distance measuring receiver, the altimeter and the means producing a signal of the ground station altitude and producing an output signal proportional to the horizontal distance to said ground station, and a combining means receiving an output of the servosystem proportional to the horizontal distance to said ground station and inputs from said altimeter and said means for producing a signal to a selected altitude to which said aircraft is to be maneuvered and said combining means producing an output aircraft command signal and said altitude of said ground station and said selected altitude having different values.

2. A navigation system according to claim 1 wherein said servosystem includes a resolver with sine and cosine windings and an input winding and said slant range signals supplied to input winding, a servomotor in said servosystem connected to drive said resolver and receiving the output of the sine winding of the resolver and the signals from said altimeter and the means producing a signal of the ground stations altitude and the output of the cosine winding proportional to the horizontal distance to said ground station.

3. A navigation system according to claim 1 wherein said combining means includes a distance computer for computing the distance to go which receives the horizontal distance to station signal from said servosystem, and an offset signal from means settable to produce an offset signal indicative of a point offset from said ground station.

4. A navigation system according to claim 3 wherein said distance computer includes means for generating a signal proportional to the desired slope, and means combining said signal proportional to the desired slope with said distance to go signal.

5. A navigation system according to claim 4 wherein said combining means includes indicating means for producing a command signal to produce a desired flight profile.

6. A navigation system for aircraft comprising:
an altimeter determining the aircraft's altitude;
means for producing a signal proportional to a selected altitude to which the aircraft is to be maneuvered;
a distance measuring receiver producing an output indicative of the slant range of said aircraft from a ground station;
means producing a signal of the altitude of said ground station;
a servosystem receiving signals from the distance measuring receiver, the altimeter and the means producing a signal of the ground station altitude and producing an output signal proportional to the horizontal distance to said ground station;
a combining means receiving an output of the servosystem proportional to the horizontal distance to said ground station and inputs from said altimeter and said means for producing a signal to a selected altitude to which said aircraft is to be maneuvered and said combining means producing an output aircraft command signal,
wherein said combining means includes a distance computer for computing the distance to go which receives the horizontal distance to station signal from said servosystem, and an offset signal from means settable to produce an offset signal indicative of a point offset from said ground station; and
wherein said distance computer includes means for generating a signal proportional to the desired slope, and means combining said signal proportional to the desired slope with said distance to go signal; and
wherein said combining means includes indicating means for producing a command signal to produce a desired flight profile; and
means for grounding the output of said distance computer to allow a fixed altitude to be flown by the aircraft.

7. A navigation system according to claim 6 including means indicating a constant altitude command.

8. A navigation system according to claim 6 including means indicating a constant slope command.

9. A navigation system according to claim 6 comprising means for determining when the aircraft's altitude approaches the desired altitude and connected to said means for grounding the output of said distance computer.

10. A navigation system according to claim 9 including an altitude alarm for indicating when the aircraft deviates from the desired altitude.

* * * * *